United States Patent
Proesmans et al.

(10) Patent No.: US 6,510,244 B2
(45) Date of Patent: *Jan. 21, 2003

(54) METHOD AND SYSTEM FOR ACQUIRING A THREE-DIMENSIONAL SHAPE DESCRIPTION

(75) Inventors: Marc R. A. B. Proesmans, Lede; Luc S. J. Van Gool, Antwerpen; André J. J. Oosterlinck, Lovenjoel; Filip P. Defoort, Zwevegem, all of (BE)

(73) Assignee: K. U. Leuven Research & Development, Leuven (BE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/202,184
(22) PCT Filed: Jun. 12, 1997
(86) PCT No.: PCT/BE97/00070
   § 371 (c)(1),
   (2), (4) Date: Mar. 16, 1999
(87) PCT Pub. No.: WO97/47942
   PCT Pub. Date: Dec. 18, 1997

(65) Prior Publication Data
   US 2002/0057832 A1 May 16, 2002

(30) Foreign Application Priority Data
   Jun. 13, 1996 (EP) .............................. 96201643

(51) Int. Cl.$^7$ .............. G06K 9/46; G06K 9/00; G06T 15/00; H04N 13/00; G01C 3/14
(52) U.S. Cl. .......... 382/203; 382/151; 382/154; 382/204; 382/206; 382/276; 382/291; 345/419; 345/424; 345/427; 348/42; 348/44; 356/12; 356/13

(58) Field of Search ................. 382/106, 108, 382/154, 203, 255, 151, 152, 204, 103, 181, 190, 206, 276, 282, 284, 288, 291, 293, 294, 295; 348/42, 169, 44; 345/419–427; 356/12, 13; 358/504; 702/85, 94, 95

(56) References Cited

U.S. PATENT DOCUMENTS

| | | | | |
|---|---|---|---|---|
| 4,584,704 A | * | 4/1986 | Ferren | 382/255 |
| 4,640,620 A | * | 2/1987 | Schmidt | 356/376 |
| 4,867,570 A | * | 9/1989 | Sorimachi et al. | 356/376 |
| 4,982,438 A | * | 1/1991 | Usami et al. | 382/154 |
| 5,003,166 A | | 3/1991 | Girod | 250/201.4 |
| 5,619,625 A | * | 4/1997 | Konno et al. | 345/419 |
| 5,692,061 A | * | 11/1997 | Sasada et al. | 382/106 |
| 5,852,672 A | * | 12/1998 | Lu | 382/154 |

OTHER PUBLICATIONS

Maruyama, et al "Rng Sensing by Projecting Multi–Slits with Random Cuts", IEEE, pp. 163–168, 1989.*

Wang "Characterizing Three–Dimensional Surface Structures from Visual Images", IEEE, pp. 52–60, 1991.*

M. Proesmans et al., "Active Acquisition of 3D Shape for Moving Objects" in 1996 IEEE Int. Conf. on Image Processing, Sep. 16–19, 1996.

M. Proesmans et al., "One–Shot Active 3D Shape Acquisition" in 13$^{th}$ Int. Conf. on Pattern Recognition, vol. III, Track C, Aug. 25–29, 1996, pp. 336–340.

(List continued on next page.)

Primary Examiner—Leo Boudreau
Assistant Examiner—Daniel G. Mariam
(74) Attorney, Agent, or Firm—Dykema Gossett PLLC

(57) ABSTRACT

Method for acquiring a three-dimensional shape or image of a scene, wherein a predetermined pattern of lines is projected onto the scene and the shape is acquired on the basis of relative distances between the lines and/or intersections of the lines of the pattern.

57 Claims, 12 Drawing Sheets

OTHER PUBLICATIONS

M. Proesmans et al., "A Sensor that Extracts Both 3D Shape and Surface Texture" in 1996 IEEE/SICE/RSJ Int. Conf. on Multisensor Fusion and Integration for Int. Systems, Dec. 8–11, 1996, pp. 485–492.

G. Hu et al., "3–D Surface Solution Using Structured Light and Constraint Propagation" in IEEE Transactions of Pattern Analysis and Machine Intelligence, vol. 11, No. 4, Apr. 4, 1989.

Y. F. Wang et al., "Computation of Surface Orientation and Stucture of Objects Using Grid Coding" in IEEE Transaction of Pattern Analysis and Machine Intelligence, vol. PAMI–9, No. 1, Jan. 1987, pp. 129–137.

Z. Chen et al., "Polyhedral Face Reconstruction and Modeling from a Single Image with Structured Light" in "IEEE Transactions on Systems, Man and Cybernetics," vol. 23, No. 3, May 1993, pp. 864–872.

Whoi–Yul Kim, "Experiment with Cross–Stripe Structured Light System Using Coon's Patch Formalism," in 1990 "IEEE International Conference on Systems, Man and Cybernetics," Nov. 4–7, 1990, pp. 25–28.

* cited by examiner

FIG. 3a
FIG. 3b
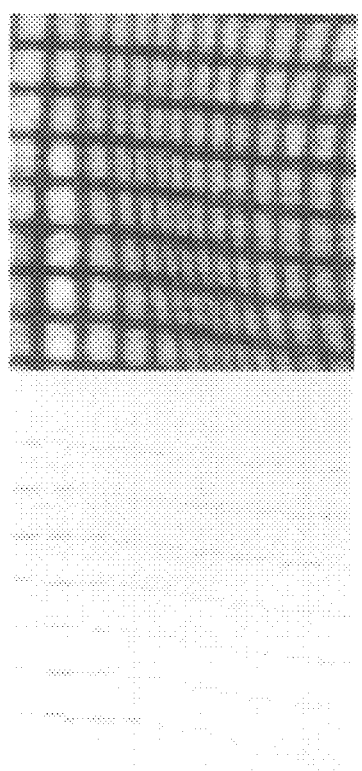
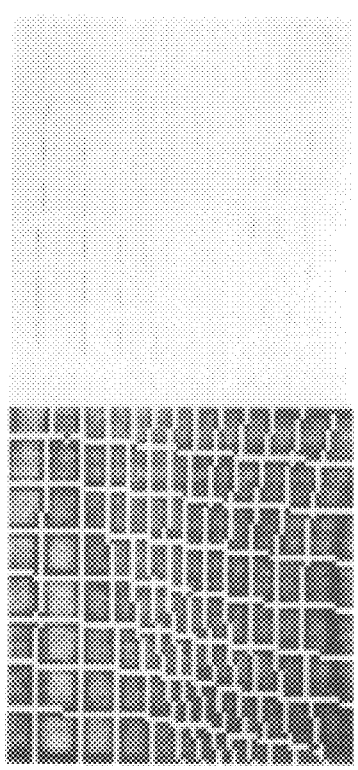
FIG. 3c
FIG. 3d
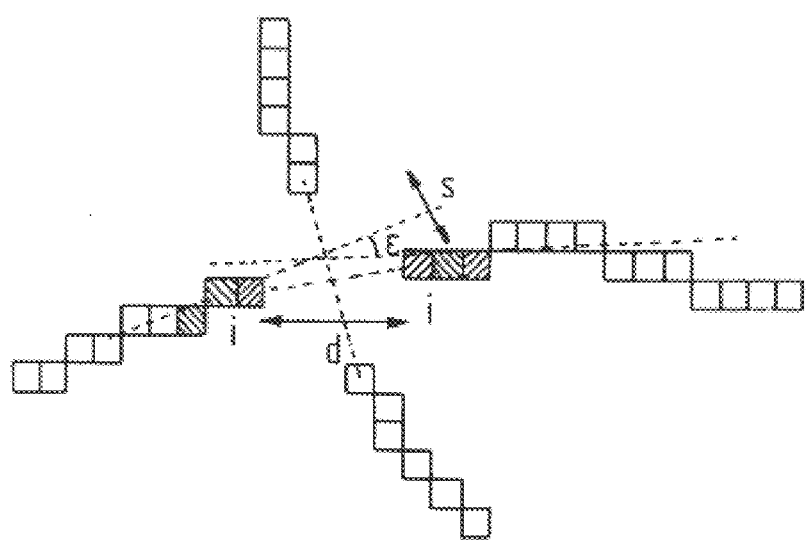
FIG. 4 frame 1 frame 7 frame 14

METHOD AND SYSTEM FOR ACQUIRING A THREE-DIMENSIONAL SHAPE DESCRIPTION

This application is a U.S. national phase of PCT/BE97/00070, filed Jun. 12, 1997, which claimed priority of European Application No. 96201643.2, filed Jun. 13, 1996.

BACKGROUND OF THE INVENTION

The use of three-dimensional images or shapes is becoming increasingly important, especially for applications such as showing objects on the Internet, virtual reality, the film industry and so on.

Three-dimensional shape descriptions are usually acquired with two or more cameras or using laser systems. Existing systems may have a high cost, may require a time-consuming calibration procedure and be difficult to transport, while in some cases the scene must be static, the working memory volume for the scene is determined or insufficient information concerning the topology of the shape is obtained.

An example of related research is an article by A. Blake et al., "Trinocular active range-sensing", IEEE Transactions on Pattern Analysis and Machine Intelligence, Vol. 15, No. 5, pp. 477–483, 1993. According to this method, two series of parallel lines are projected sequentially. The lines in the image can be identified by ensuring that the projected lines and epipolar lines intersect laterally. The lines may not therefore be too close together.

Another example is an article by Vuori and Smith, "Three dimensional imaging system with structured lighting and practical constraints", Journal of Electronic Imaging 6(1), pp. 140–144, 1997. According to this method a single pattern is projected but, limitations are imposed on the dimensions of the scene for recording and on the relative distances between the pattern elements. This makes it possible to predict in which part of the image plane each individual pattern element is projected.

In addition, known systems and methods always start from absolute measurements and dimensions, which is not always required, particularly not when the application is aimed at showing and not at measuring the objects.

SUMMARY OF THE INVENTION

The present invention provides a method for acquiring a three-dimensional shape or image of a scene, wherein a predetermined pattern is projected onto the scene and the shape is acquired on the basis of the relative deformations of the pattern as detected in one or more images.

The invention further provides a system for acquiring a three-dimensional shape or image of a scene, including:
- at least one pattern generator for projecting a pattern on the scene;
- at least one camera for making an image or images of the scene;
- computing means for determining the shape of the scene.

The required hardware is simple and the system according to the present invention is therefore not very expensive.

According to the present invention it is no longer required to individually identify components of the projected pattern, such as lines or dots, either via a code in the pattern itself or via limitations imposed by the scene and/or the arrangement or a priori knowledge in respect thereof. In the method according to the present invention the shape can be acquired via the relative positions of the components in the pattern, for instance by determining the relative sequence of pattern lines.

According to the present invention a single image will suffice to acquire a three-dimensional image or a three-dimensional shape description and an acquisition time is required which is no longer than that for making a single image.

Because the recording time of a single image can remain limited and since reconstructions can be performed for a quick succession of different images, moving objects and their three-dimensional movements and changes of shape can be reconstructed.

According to the present invention the calibration procedure can be kept simple and few limitations need be imposed on the relative position of the pattern generator(s) and camera(s).

According to the present invention the projected pattern can be kept very simple and strongly interlinked, such as for instance a grid of lines. Owing to the simplicity, the resolution of the pattern and thereby of the three-dimensional reconstruction can be kept high. Due to the strong interlinking of the pattern, it becomes possible to determine the correct surface topology explicitly as a component of the output.

According to the present invention the absolute position of components of the pattern within the entirety of the pattern is of secondary importance. Three-dimensional shape descriptions can be generated without such information, except for a scale factor, by assuming a (pseudo-)orthographic model for the geometry of pattern projection and image formation. Perspective effects in this geometry are preferably kept limited.

According to the present invention both the three-dimensional shape and the surface texture of scenes can be determined. It is herein possible to eliminate problems of alignment of shape and texture since shape and texture are determined using the same camera(s). The final output, which can be a three-dimensional shape description with or without texture, can of course be made in any desired format, including formats which are for instance suitable for graphic work-stations or Internet.

According to a preferred embodiment the surface texture can moreover be acquired from the same image that is used to determine the three-dimensional shape. A similar method can also be extended to cases where a pattern is employed with absolute definition of the components. It will be apparent that the procedure for acquiring coloured or multi-spectral surface texture, i.e., built up of different spectral base images, does not differ essentially from the procedures for one base image.

According to a preferred embodiment the projected pattern is regular and composed of similar basic shapes, such as rectangles or squares, formed by the composition of two mutually perpendicular series of parallel equidistant lines.

According to a preferred embodiment calibration takes place by showing the system two planes between which the angle is known, for instance a right angle. The parameters required for the shape definition can be determined herefrom, such as the angle of reflection of the projected rays relative to the image plane and, if necessary, the height/width ratio of the pixels.

BRIEF DESCRIPTION OF THE DRAWINGS

Further advantages, features and details of the present invention will be elucidated on the basis of the following description of the preferred embodiment thereof with reference to the annexed figures.

FIGS. 3a–3d show a detail view with the results of line detectors and the combination thereof after a first correction step;

FIG. 4 shows an example of a discontinuity in the detected pattern;

DETAILED DESCRIPTION OF THE PREFERRED EMBODIMENTS

Figure 1:
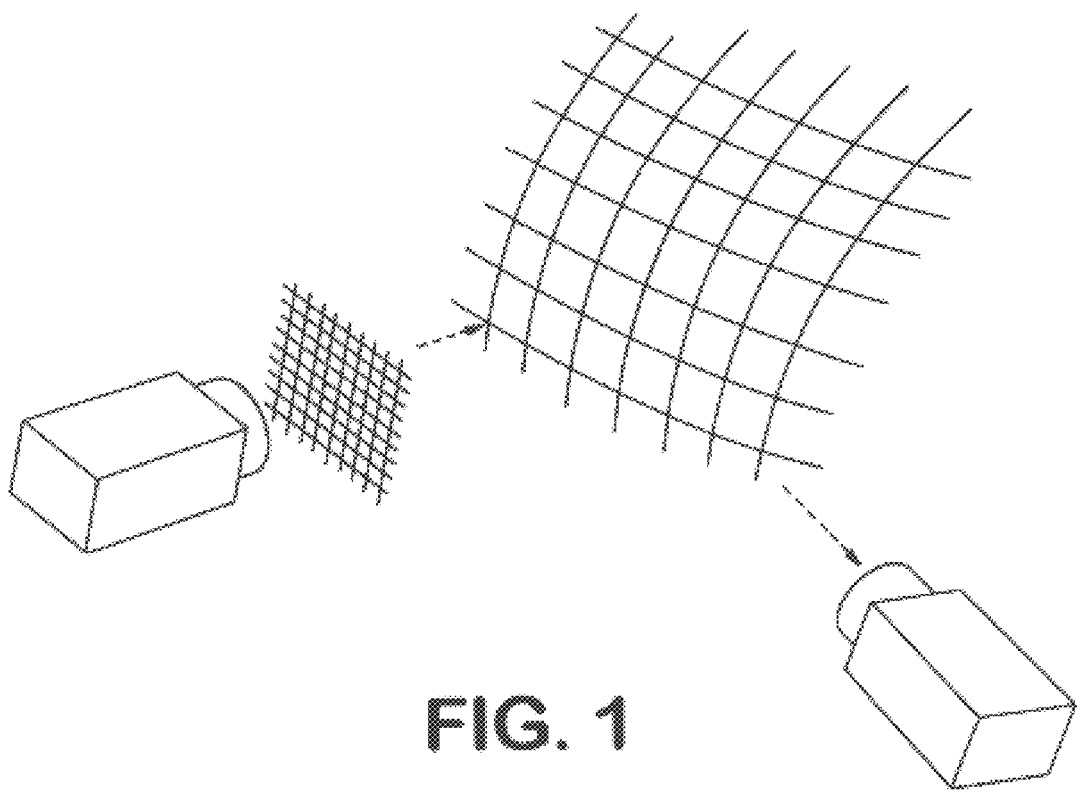
FIG. 1 shows a schematic view of a preferred embodiment of the method according to the present invention.

In the arrangement of FIG. 1 a pattern is cast onto the scene by a projector and captured by a camera in an image plane. In this embodiment the projector and camera were placed at a distance of about 4 m from the scene. The angle between the projection direction and the viewing direction was approximately 7■. The projected pattern was a substantially square grid consisting of 600 horizontal and 600 vertical lines arranged on a slide using lithographic techniques, with a line thickness of 10 μm and placed at mutual distances of 50 μm. In this embodiment a 512×512 image was formed, taken up for the greater part by the part of the scene for reconstruction and typically 100 horizontal and 100 vertical projected lines were effectively visible in the image.

Figure 2:
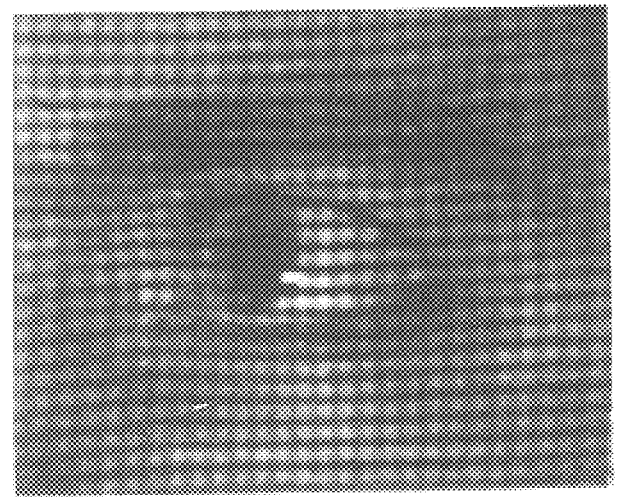
FIG. 2 shows an example of a detail of an image acquired with the arrangement of FIG. 1.

FIG. 2 shows a detail of an image recorded under the above mentioned conditions.

FIG. 3a shows such an image in more detail and the response of horizontal and vertical line detectors is shown in FIGS. 3b and 3c. After determining the central line of these responses and a first filling of gaps, the central lines are combined in an initial reconstruction of the image pattern (d).

Due to, for instance, noise or other causes, discontinuities in the found pattern lines will be present in regions where the response of a line detector is relatively poor. FIG. 4 shows an example of two lines which are interrupted, in this case in the vicinity of their intersection. As shown in FIG. 4, the immediate vicinity of the two end points of the segment of a line are scanned in the present preferred embodiment of the invention over a region in the line of a width s. If points of other line segments are encountered in this process, a score is assigned thereto based on characteristics such as the difference in the angle of inclination ε of the line segments close to the discontinuity, the distance to the end points of those segments, the difference in intensity of the given end point and the end point of a candidate segment, as well as the average intensity along the rectilinear link between the end points. Two segments are joined together if the sum of the scores is optimal. Such a result is already shown in FIG. 3d.

Figure 5A:
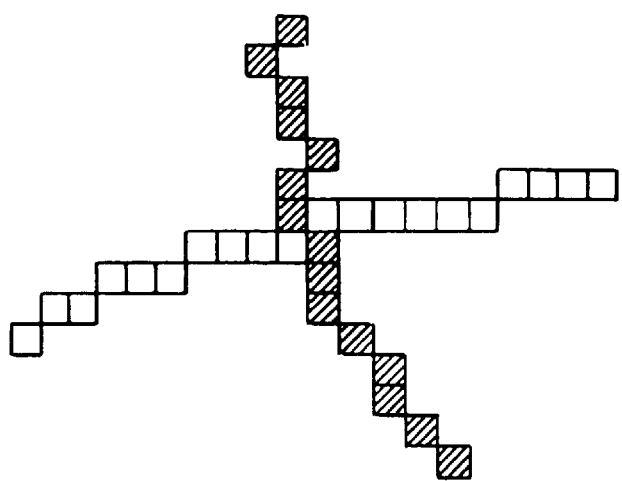
FIGS. 5a,b,c show a diagram elucidating the construction of the grid.
Figure 5B:
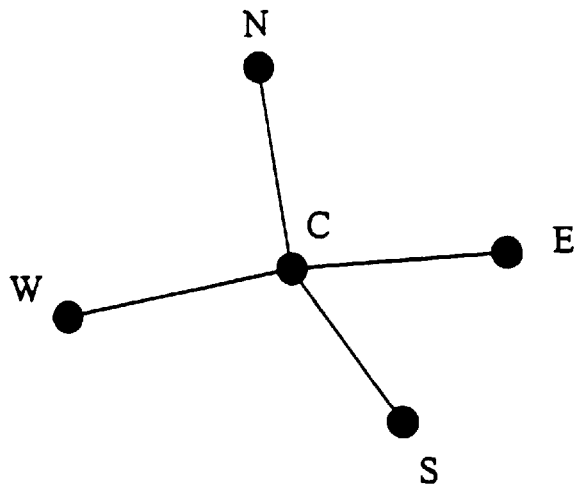
Figure 5C:
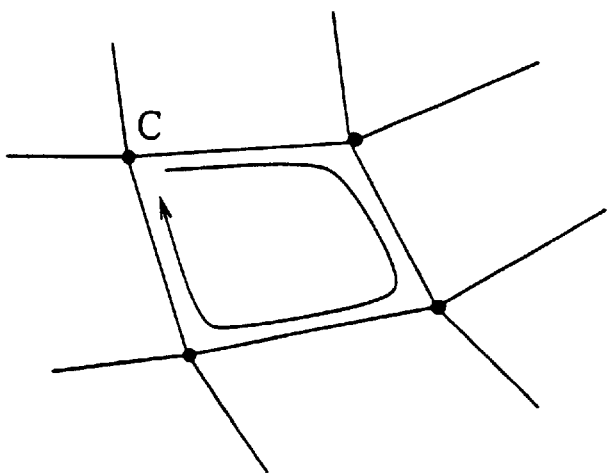

FIGS. 5a–5c shows how the crossings or intersections are constructed. FIG. 5a shows the intersecting of two lines. Such intersections are brought together in a grid representation, wherein each grid point has a maximum of four neighbours (N, E, S and W), as shown in FIG. 5b. Grid points which are vertices of a full quadrangle are of particular importance in subsequent correction steps. These are found as points of return by successive selection of the E neighbour, its S neighbour, its W neighbour, its N neighbour (c).

Figure 6A:
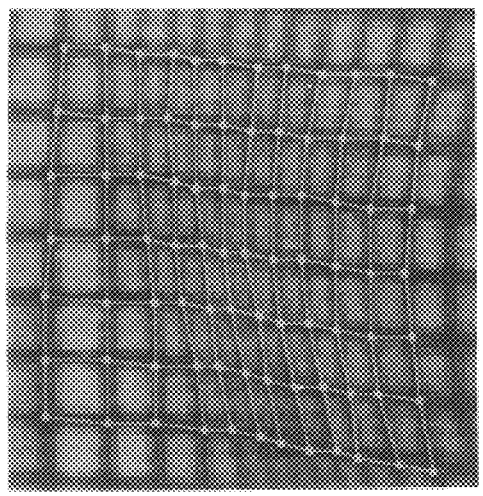
FIGS. 6a–6b show a diagram elucidating the refining of the positions of the grid.
Figure 6B:
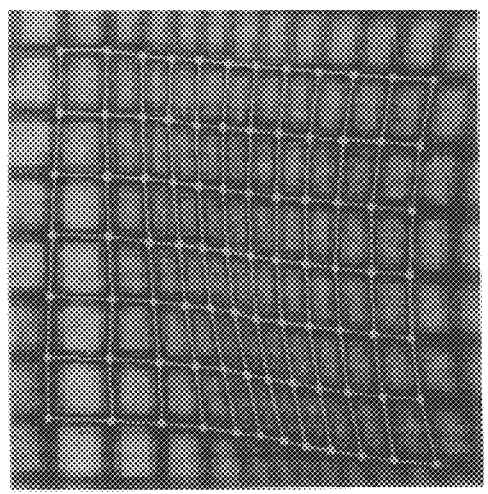

FIGS. 6a and 6b show a refining step applied to the grid. This step treats the grid as a system of linked lines, the position of which is refined by drawing out their continuity relative to their original discrete representation, shown in FIG. 6a, and by adding an attractive force which also gives the refined line positions a preference for positions with image intensities of the same polarity as the lines in the pattern. Pixel accuracy is not enough for good 3D reconstruction. Therefore, the crossings are determined with sub-pixel precision. A snake-like process changes the grid to let it more closely follow the pattern lines, minimizing $$E = \sum_{p=1}^{N_P} I(C_p, E_p) + \sum_{p=1}^{N_S} I(C_p, S_p) + \lambda \left( \sum_{p=1}^{N_P} (y_{C_p} - y_{E_p})^2 \right) +$$

$$\kappa \left( \sum_{p=1}^{N_E} (x_{C_p} - x_{E_p})^2 \right) + \lambda \left( \sum_{p=1}^{N_S} (x_{C_p} - x_{S_p})^2 \right) + \kappa \left( \sum_{p=1}^{N_S} (y_{C_p} - y_{S_p})^2 \right)$$

with $N_E$ and $N_S$ the number of pixels with E and S neighbours, resp., and where I( ) denotes the average intensity along the line segment between two neighbouring grid points. Minimization moves the grid towards the darker positions in the image, i.e. the line centers. The other terms render the grid smoother. The parameters λ and κ control the smoothness of the lines, where initially λ>κ (or even κ=0), to mainly penalize noise in the portions along the direction normal to the line orientation. Gradient descent is used to minimize E:

$$\forall C = (x_p, y_p): \frac{dx_p}{dt} = -v\frac{dE}{dx_p}, \frac{dy_p}{dt} = -v\frac{dE}{dy_p}$$

Typically, the new crossing positions are much more precise. The result of this improvement step is shown in FIG. 6b.

Figure 7:
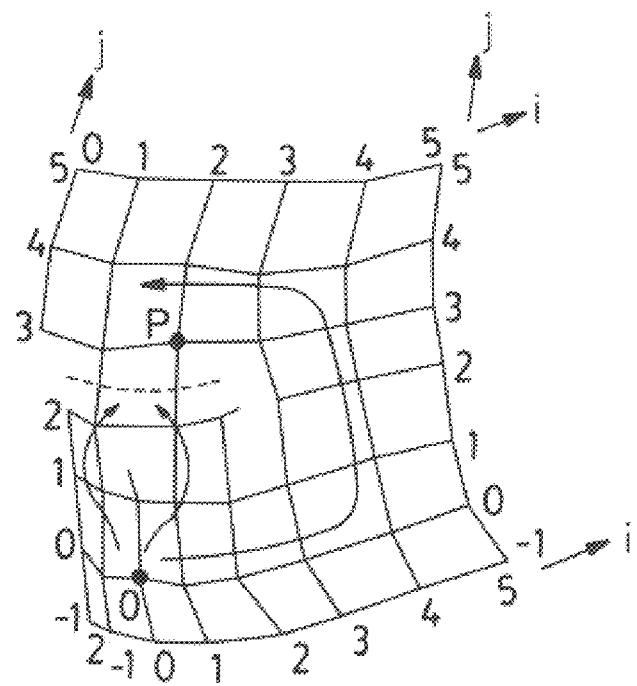
FIG. 7 shows a diagram elucidating the provision of the grid points with a label.

The grid points are provided with labels or numbers as illustrated in FIG. 7. A random grid point in the image is chosen as reference point O(0,0). The other grid points are given two labels, a "horizontal" label i and a "vertical" label j, which give the relative position relative to the reference. The horizontal line labels i are incremented with each E step or decremented with each W step required to reach the grid point from the reference point. The vertical line labels j are incremented with each N step or decremented with each S step required to reach the grid point from the reference point. Defining of the labels amounts to defining the coherence of the grid.

FIG. 7 likewise shows an example wherein different labels can result from choosing a different path, for instance for the point P. Herein the circumscribed path to the right is more reliable since this avoids the false parts of the grid designated with white. The reliability of a path is determined on the basis of the reliability of the individual grid points along the path and decreases the more links to adjacent grid points are missing and the more the individually found quadrangles in the observed pattern show less resemblance to squares as viewed from the projection direction. The labels are corrected iteratively/recursively where necessary. Older labels are herein overwritten by newer labels if the latter are more reliable.

Figure 8A:
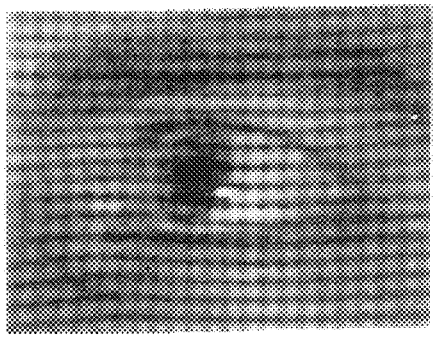
FIGS. 8a–8b show the result of the complete process of grid extraction for a detail image.
Figure 8B:
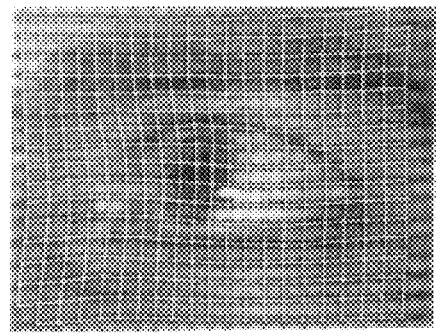

FIG. 8b shows the finally found grid for the detail image of FIG. 8a.

For further details in respect of defining the grid reference see M. Proesmans et al., "Active acquisition of 3D shape for moving objects," in 1996 IEEE Int. Conf. on Image Processing, Sep. 16–19, 1996.

Line detection will unavoidably introduce false links. For instance, stripes might be linked accross discontinuities, resulting in spurious quadrangles. Noise and tiny details can also introduce errors. The affected quadrangles typically do not satisfy the necessary constraints. The easiest way to verify their validity is to look at the pattern from the projector's view point based on the reconstruction and the extracted relative orientation of the projector (and not by taking another image!): quadrangles should look square. The test is based on quadrangle area A over perimeter L squared:

$$\rho = \frac{16A}{L^2} \cdot 0 \le \rho \le 1$$

The ratio ρ is optimal (ρ=1) for perfect squares. The more a quadrangle deviates from the square shape, the more ρ will tend to zero. This ratio is introduced to steer the labeling process. The reliability of the path will therefore not only depend upon the connectivity of the grid but also the squareness of the quadrangles as "seen" from the projector. As a result, inconsistencies in labeling can be found nearby gaps or discontinuities in the grid. Gaps will automatically be filled, discontinuities show up as holes in the reconstruction.

Once grid consistency has been restored throughout, the snake process (1) is rerun with λ=κ. This step further reduces the disturbing influence of surface texture.

After the grid has thus been precisely defined, the three-dimensional shape thereof can be computed.

The three-dimensional shape of the visible surface illuminated with the pattern is reconstructed on the basis of the three-dimensional positions of the grid points. In the preferred embodiment the relative positions of these latter are obtained from the intersections of two parallel beams of rays, one of which represents the pattern projection rays and the other the image projection rays and which are such that they form an angle as defined by calibration and that their intersections are consistent with the detected positions of the grid points in the image.

For further details relating to the definition of the three-dimensional shape description and the calibration used in the preferred embodiment see M. Proesmans et al., "One-shot active 3D shape acquisition" in Proc. Int. Conference on Pattern Recognition, Aug. 25–29, 1996, pp. 336–340.

A simplified projection model will be used, however. Both the projection of the pattern as its observation by the camera are assumed to be modelled well enough by pseudo-orthographic projection (orthographic proj.+scaling). This assumption is reasonable in many cases and a careful setup of the optics helps to increase precision.

Figure 11:
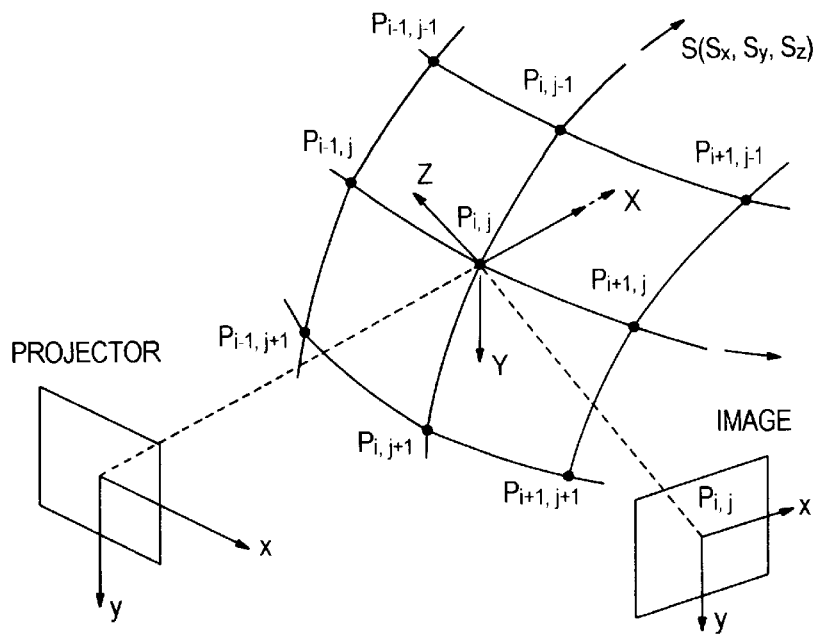
FIG. 11 shows projections of a patterns of equidistant and orthogonal lines onto a scene.

A pattern with a series of equidistant and orthogonal lines, i.e. a pattern of squares, is projected on a scene, and observed from a different viewing direction. FIG. 11 shows the situation for a small patch on the grid. The figure shows a point $P_{i,j}$ on the surface and its 8 neighbours. $P_{i,j}$ is the crossing of two lines belonging to orthogonal planes of projection (pseudo-orthographic projection model). The points are labeled according to the line crossing they correspond to. For ease of reference, we will refer to the two sets of grid lines as first and second set. Projection planes of the first set are written $f_xX+f_yY+f_zZ+c_i=0$, and of the second $s_xX+s_yY+s_zZ+c_j=0$, where $f=(f_X,f_Y,f_Z)$ and $s=(s_X,s_Y,s_Z)$ are orthogonal unit vectors. The distance between the planes in each set is assumed to be d. For the extraction of the 3D shape, it is impossible to know exactly what line from the grid is observed. We can not use correspondence information between the grid and the observed lines. In fact, because a pseudo-orthographic projection model is assumed, it guarantees that at least an affine reconstruction can be obtained. We investigate under what conditions the existence of the pattern can help to do better.

Consider the point $P_{i,j}$. Assume for a moment that projections are purely orthographic. The scaling of pseudo-orthographic projection is introduced later. We also assume for $$f_xX_{i,j}+f_yY_{i,j}+f_zZ_{i,j}+c_i=0$$

$$s_xX_{i,j}+s_yY_{i,j}+s_zZ_{i,j}+c_j=0$$

now that the camera pixels are square. The two planes through $P_{i,j}$ can be written as and the world coordinate frame is aligned with the camera as in FIG. 11. The scene coordinates $X_{i,j}$ and $Y_{i,j}$ are the observed image coordinates, since orthographic projection is assumed, $c_i=c_o-id$, $\dot{c}_j=\dot{c}_o-d$, where $P_{o,o}$ is some reference point. Similar equations can be written for neighbouring points $P_{i+1,j}$ and $P_{i,j+1}$. Then, by appropriately combining these equations and eliminating the unknown depths, one can verify that $$(f_xs_z-s_xf_z)(X_{i+1,j}-X_{i,j})+(s_yf_z-f_ys_z)(Y_{i+1,j}-Y_{i,j})-f_zd=0,$$

$$(f_xs_z-s_xf_z)(X_{i,j+1}-X_{i,j})+(s_yf_z-f_ys_z)(Y_{i,j+1}-Y_{i,j})+s_zd=0 \quad (1)$$

Repeating the same steps for $P_{i-1,j}$ and $P_{i,j-1}$ yields $$(f_x s_z - s_x f_z)(X_{i+1,j} - 2X_{i,j} + X_{i-1,j}) + (s_y f_z - f_y s_z)(Y_{i+1,j} - 2Y_{i,j} + Y_{i-1,j}) = 0,$$

$$(f_x s_z - s_x f_z)(X_{i+1,j} - 2X_{i,j} + X_{i-1,j}) + (s_y f_z - f_y s_z)(Y_{i+1,j} - 2Y_{i,j} + Y_{i-1,j}) = 0, \quad (2)$$

Figure 12:
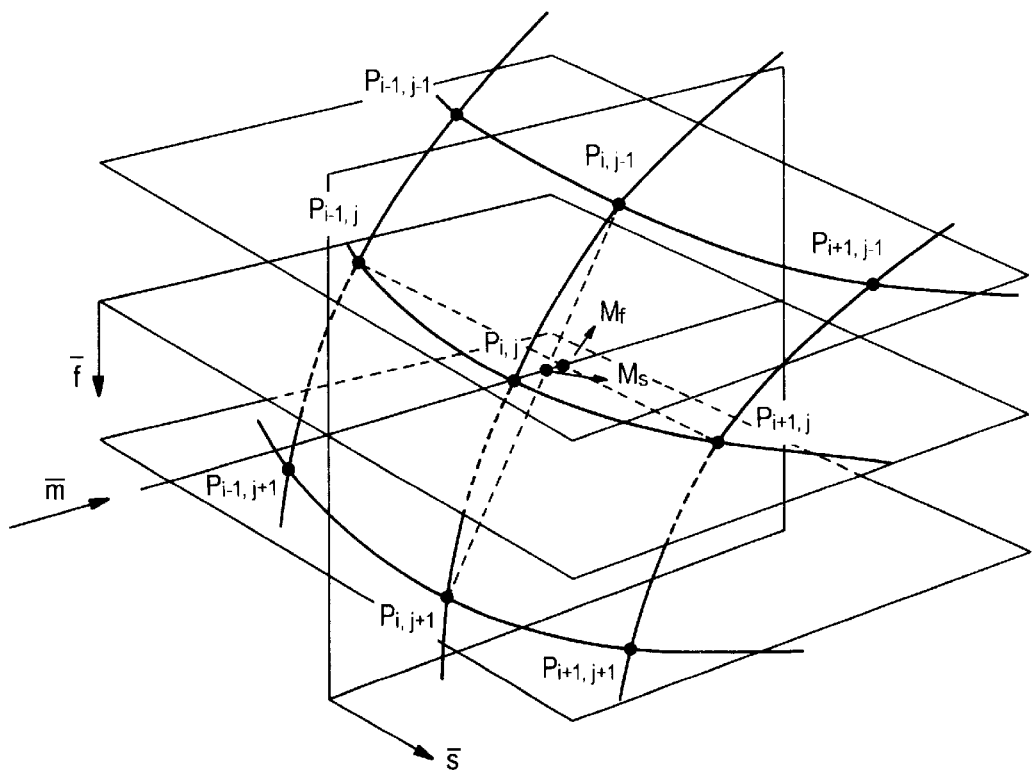
FIG. 12 shows that the midpoints $M_p$ and $M_s$ both lie on the intersection line through $P_{i,j}$, that is that $M_p$, $M_s$, and $P_{i,j}$, are collinear.
Figure 13:
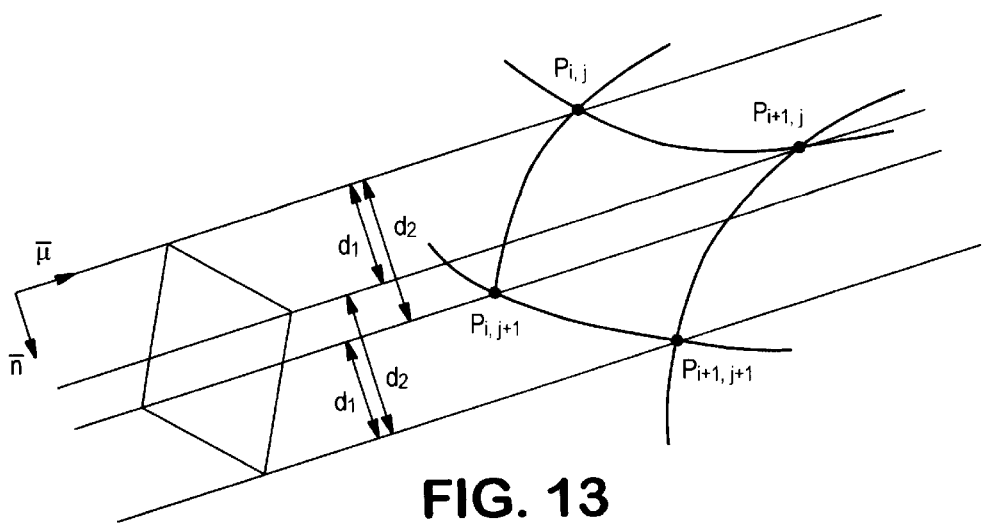
FIG. 13 shows that the orientation as well as the relative position of intersection lines in the projected pattern can be determined from the image.

Equations (2) and (1) yield the following parameters (using for instance least squares)

$$\mu_X = k(s_y f_z - f_y s_z) \quad \mu_f = k f_z d$$

$$\mu_Y = k(f_x s_z - s_x f_z) \quad \mu_s = k s_z d \quad (3)$$

where k is an unknown scale factor. What do they mean? The two sets of planes intersect in parallel lines placed at regular distances, and their direction is given by the vector m=s×f. It is the same direction in which the pattern is projected on the scene. Hence the ratio $\mu_X/\mu_Y = m_X/m_Y$ gives the orientation of the intersection lines—henceforth "rays"—as seen in the image. Bearing this in mind, eqs. (2) state that the midpoints $M_f$ of $P_{i-1,j}$ and $P_{i+1,j}$, and $M_s$ of $P_{i,j-1}$ and $P_{i,j+1}$, both lie on the intersection line through $P_{i,j}$ (FIG. 12). Eqs. (2) state that the relative position of the intersection lines in the image are also fixed (FIG. 13).

$$d_1 = \frac{|\mu_f|}{\sqrt{\mu_X^2 + \mu_Y^2}} \quad \text{and} \quad d_2 = \frac{|\mu_s|}{\sqrt{\mu_X^2 + \mu_Y^2}}$$

Notice that the above constraints do not use the perpendicularity of the two sets of planes. They apply as soon as two non-parallel sets of parallel and equidistant lines are projected. Assuming the sets are orthogonal, and that f and s are unit vectors gives us in addition to equations (3) three additional constraints, which yields the following $$\mu_Y s_X - \mu_X s_Y + \frac{\mu_f}{d} = 0 \quad \text{and} \quad d = \sqrt{\frac{\mu_f^2 + \mu_s^2}{\mu_X^2 + \mu_Y^2}}$$

This means that the square side d of the pattern can be determined from the image data. It is not possible to uniquely define the other 7 parameters $(f_X, f_Y, f_Z)$, $(s_X, s_Y, s_Z)$, and k, but it suffices to choose one of them in order to fix the others. A simple interpretation of the remaining degree of freedom is the rays' angle of inclination a with respect to the image plane.

Figure 15:
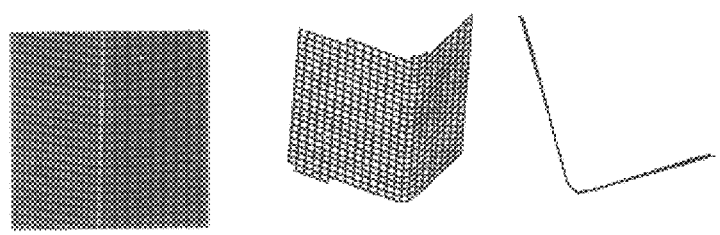
FIG. 15. shows a method of calibration in accordance with the present invention in which a box with orthogonal planes is used as a test pbject, on the left the original captured image being shown and the two images on the right showing reconstructed surfaces.

In this section we show that in order to determine the correct angle of inclination α, it is sufficient to know the relative orientation of two planar patches in the scene. The calibration of the system therefore only requires to show it such configuration. For the experiments a box with perpendicular sides was used (FIG. 15).

Figure 14:
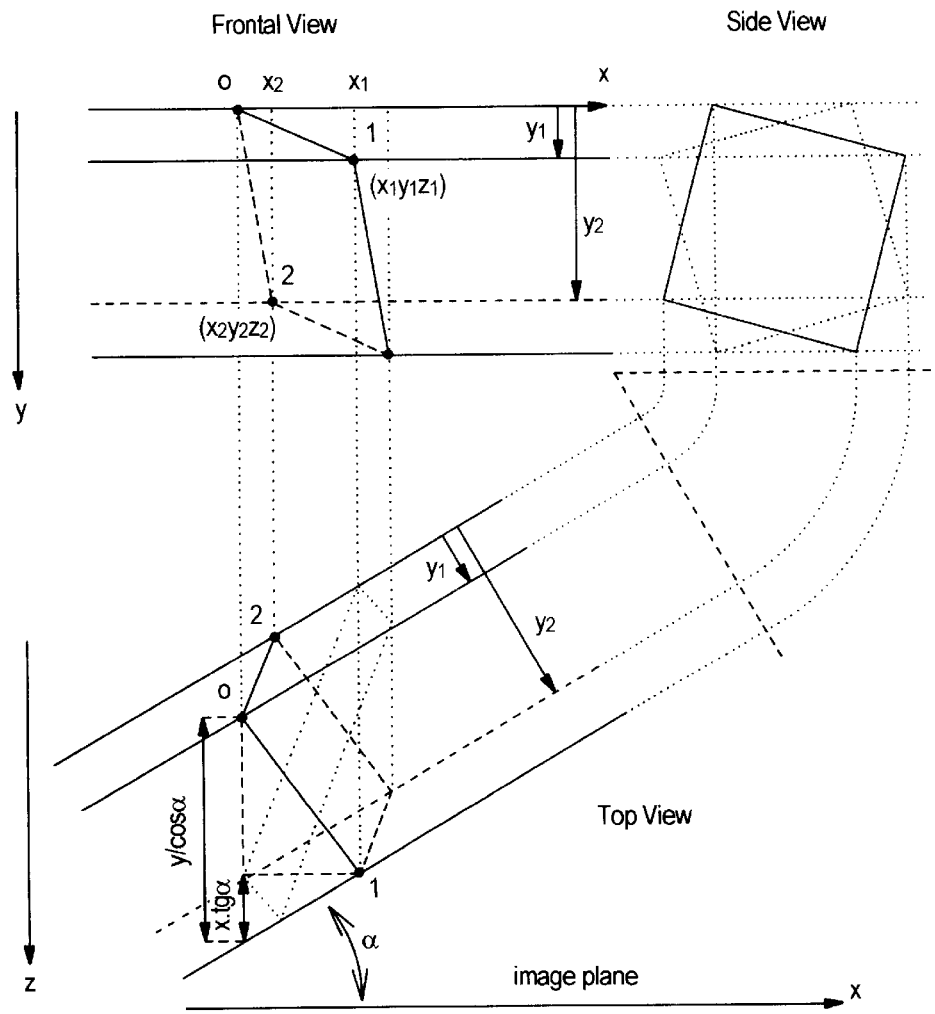
FIG. 14 shows that in the situation in which a square grid of lines is projected onto a plane, a square of the grid takes the form of a parallelogram both on the plane and in the image.

If the grid is projected onto a plane, all squares project to the same parallelogram shape in the image. Consider the four projection rays through the vertices of a single square. The situation is illustrated in FIG. 14. The top right part of the figure shows the square as "seen" from the projector's point of view. Actually, in keeping with the mirror reversal uncertainty, two interpretations are given, one bold and one dotted. However, only surface normals that allow both the projection pattern to reach the surface and the camera to see it, are acceptable. This rules out the dotted option. At the top left of FIG. 14, the parallelogram is shown as it is seen in the image (after aligning the projection of the rays with the horizontal image axis). At the bottom, a top view is given. This view shows the depth of the parallelogram vertices with respect to the camera.

Taking the vertex o as the origin of a local coordinate system, one finds $$z_1 = -x_1 tg\alpha + \frac{y_2}{\cos\alpha} \quad \text{and} \quad z_2 = -x_2 tg\alpha - \frac{y_1}{\cos\alpha}.$$

The vectors $\bar{x}_1 = (x_1, y_1, z_1)$ and $\bar{x}_2 = (x_2, y_2, z_2)$ correspond to the parallelogram sides and $\bar{n} = \bar{x}_1 \times \bar{x}_2$ is the normal to the plane on which the grid is projected. The same procedure is applied to both planar patches.

The second plane yields vectors $\bar{x}'_1 = (\dot{x}_1, \dot{y}_1, \dot{z}_1)$, $\bar{x}'_2 = (\dot{x}_2, \dot{y}_2, \dot{z}_2)$, and $\bar{n}'$ say. In order not to overload this paper with formulas, we will assume the planar patches make an angle of 90°, i.e. $\bar{n} \cdot \bar{n}' = 0$. In that case we get a rather simple expression for the angle of inclination α:

$$\sin\alpha = \frac{x_1 x'_1 + x_2 x'_2 + y_1^2 + y_2^2}{x_1 y_2 + x'_1 y_2 - x_2 y_1 - x'_2 y_1}$$

In general the intersection lines do not project horizontally on the image plane, but the local coordinate system can be rotated until they do. Having α it is quite straightforward to find the other variables. Indeed, we can define $\mu_Z = tg(\alpha) \sqrt{\mu_X^2 + \mu_Y^2}$ such that $\bar{\mu} = (\mu_X, \mu_Y, \mu_Z) = k(s'f):k = \|\bar{\mu}\|$, $\mu_Z = k(s_X f_Y - f_X s_Y)$ This allows to determine all the unknowns. As soon as $(f_X, f_Y, f_Z)$, $(s_X, s_Y, s_Z)$, and d have been determined, the relative depth of each individual grid point can be calculated with respect to other such points to which it is connected. Relating the depths to the point $P_{0,0}$ it can be verified that two solutions apply $$f_X(X_{i,j} - X_{0,0}) + f_Y(Y_{i,j} - Y_{0,0}) + f_Z(Z_{i,j} - Z_{0,0}) = j \cdot d$$

or $$s_X(X_{i,j} - X_{0,0}) + s_Y(Y_{i,j} - Y_{0,0}) + s_Z(Z_{i,j} - Z_{0,0}) = i \cdot d$$

The mean is taken as a compromise.

In the above reasoning, square pixels were assumed. If the pixel ratio is not known, it can be determined by introducing a priori information about two additional planar patches or the same pair of patches seen under a different orientation! We omit the details due to lack of space.

During the calibration stage, a tool is provided to automatically detect the planar patches in the scene. These show up as regions were the individual quadrangles undergo the same deformation. They are found by projecting the coordinates of the quadrangles in Hough-like work spaces. Large clusters in these spaces indicate the existence of planar patches.

Highlights on surfaces that are due to specular reflection can be very instructive. Consider such image positions where the projector's and camera's viewing directions are mirror-symmetric with respect to the surface normal. There the camera will "see" perfect squares if the aspect ratio is 1 (square pixels). Hence, the detection of specularities (potentially assisted by the use of polarization techniques [L. Wolff, On the relative brightness of specular and diffuse reflection, CVPR, pp. 369–376, 1994.]) allows one to calculate the pixel ratio by observing the factor needed to turn the locally observed parallelograms into squares. This does away with the need for one of the calibration steps. Combining these results, it follows that surfaces with specular spikes and behaving Lambertian elsewhere can yield enough information to eliminate the need for calibration altogether.

It is also interesting to note that for Lambertian surfaces and known pixel ratio the reconstruction problem can at least in principle be completely solved. Indeed, the reflection will be maximal when the surface normal is parallel to the incoming light and small squares observed at such locations are perpendicular to the incoming light rays. Shape-from-symmetry results applied these squares yield the local surface normal and hence the angle of inclination α [L. Van Gool, T. Moons, D. Ungureanu, and E. Pauwels, Symmetry from shape and shape from symmetry, IJRR, 14(5), pp. 407–424, 1995.].

After the grid has thus been precisely defined, in a preferred embodiment the texture is also extracted from the same image which was used for the shape definition.

In the image the cross section of an intensity profile of a pattern stripe will be Gaussian, approximated by the function:

$$W(X)=1-e^{-X/\sigma)^n}$$

Figure 9A:
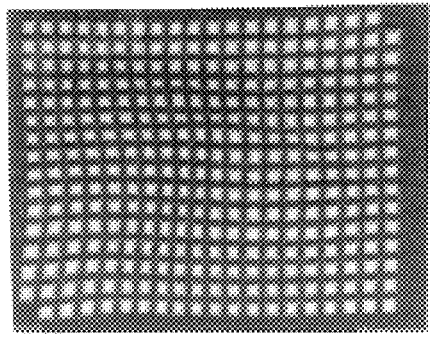
FIGS. 9a–9b show two images elucidating the step for acquiring surface texture.
Figure 9B:
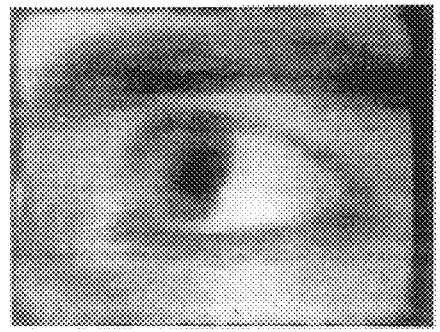
Figure 10A:
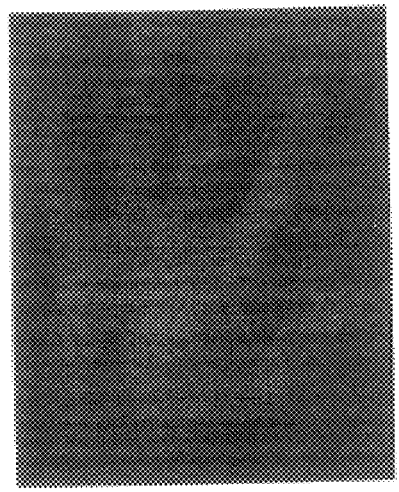
FIGS. 10a–h show examples of obtained results.
Figure 10B:
Figure 10C:
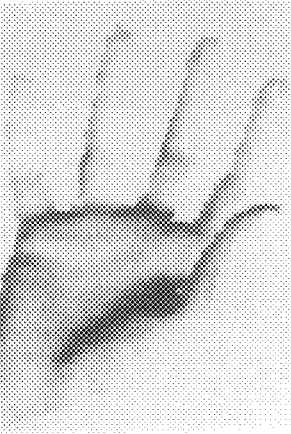
Figure 10D:
Figure 10E:
Figure 10F:
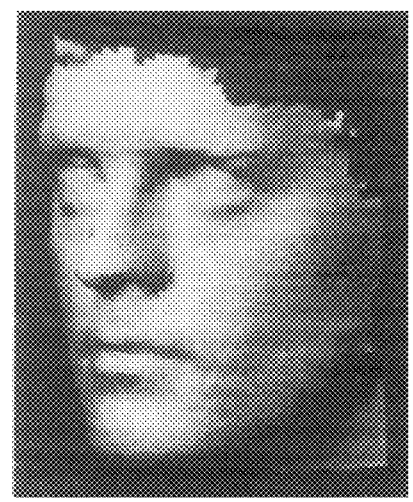
Figure 10G:
Figure 10H:
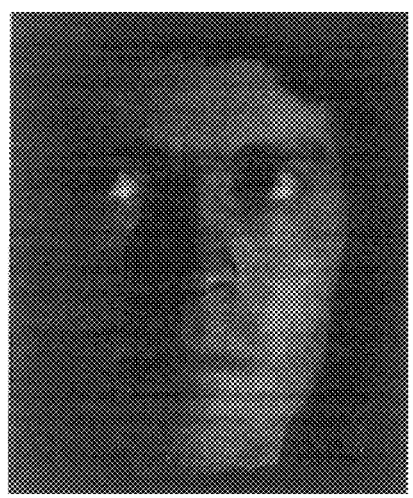

In an experiment n=2 was chosen and the function was Gaussian. The intensity attenuation of the pattern stripes was subsequently modelled by superimposing this profile over the extracted grid lines. The result for the grid of FIG. 8b is shown in FIG. 9a. The greater the attenuation, the less representative for the real texture the image intensity is considered to be. In order to determine the texture an interpolation of intensities is taken as starting point, wherein account is taken of the relative attenuations and the distances to the point where the intensity is restored. The result serves only to initialize a non-linear diffusion process on the intensity, which eliminates the remaining traces of the pattern stripes. The result for the image of FIG. 8a is shown in FIG. 9b.

Finally, the extracted texture is arranged ("mapped") on the surface.

For further details relating to the determining of the surface texture, see M. Proesmans et al., "A sensor that extracts both 3D shape and surface texture" in Proc. 1966 IEEE/SICE/RSJ Int. Conference on Multisensor Fusion and Integration for Intelligent Systems, Dec. 8–11, 1996, pp. 485–492.

An important assumption made for the mathematical reconstruction procedures is that a pseudo-orthographic projection model suffices. In practice, this restriction is not far-fetched, because accommodating a sufficiently large variation in depth requires projector and camera optics that yield a correspondingly large depth-of-field (e.g. having the camera zoom in on the objects). Given this restriction, there are two remaining degrees of freedom left before the object shape can be retrieved up to an unknown scale factor. The first unknown parameter is the aspect ratio of the camera pixels. Assume for a moment that the pixel aspect ratio is known. The second unknown parameter is the depth component of the direction of projection relative to the camera.

This second parameter can be extracted by showing the system a configuration of two planes which subtend a known angle. FIG. 15 shows a pair of orthogonal planes (actually a dustbin, but the corner of a room could e.g. also serve as calibration configuration). The middle and right figures show two reconstructions, after retrieval of the second parameter from this image. The right image is particularly instructive since it shows a top view that exhibits the orthogonality of the planes. Even the rounded corner is nicely retrieved.

The first parameter—the pixel aspect ratio of the camera—can also be extracted very easily if it was not known already. Indeed, presenting the same calibration configuration but rotated with respect to the first presentation is sufficient.

The aspect ratio will have to be recalculated only after replacing the camera. Recalibration for the second parameter will be required more often, i.e. every time the relative position of the projector and the camera is changed. All in all, calibration of the system is relatively simple and requires nothing that one could not readily find in an indoor environment.

As noted, the reconstruction will be determined up to an unknown scale factor. The simplest way of determining this factor is to measure a length in the scene or, alternatively, to keep it undetermined as may well suffice for visualisation or navigation purposes. In the latter case time-to-contact procedures can replace the measurement of absolute dimensions or known distances traveled by the robot can also give the scale away.

The extraction of the surface intensity (the surface texture) literally requires reading between the (grid) lines. The latter have already been extracted for the sake of range extraction, and this knowledge will be exploited further now.

Figure 16:
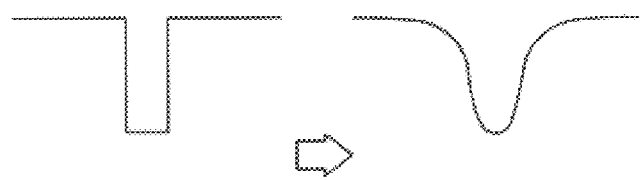
FIG. 16 shows that clearly delineated lines of a pattern projected onto an object (left image) appear in the captured image as having an intensity profile (right image)

Although the lines in the pattern are perfectly straight and clearly delineated, the lines in the image are not. The projected lines appear in the image with a blurred, Gaussian-like profile (FIG. 16) due to the projector or camera being out of focus and diffraction of the projected light (the projection grid has been produced with lithographic techniques and is very fine). If the intensity attenuation factor over a cross-section of a projected grid line is modeled using the function above, in case n approaches infinity, this function describes a perfectly delineated line. The second parameter, σ, is related to the actual width of the lines in the pattern and is set automatically by the system.

Figure 17:
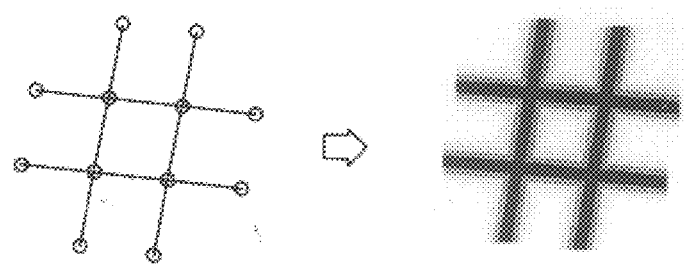
FIG. 17 shows a weight image (on the right) extracted from the grid (on the left) using an intensity attenuation factor.

This model is used to generate a weight image W that estimates the level of darkening by the projection pattern at each point in the image. To that end the extracted grid lines are first convolved with the attenuation function w(x) oriented normally to their orientation. Points may fall within the influence region of several lines. In that case the minimum value (the maximal attenuation) is chosen (FIG. 17).

Directly using the values in W to undo the intensity attenuation would be too simple a scheme. Rather, the value in each point of W is interpreted as denoting the reliability of the observed intensity for the simulation of a homogeneously illuminated surface. The intensity image is then constructed following a three-step procedure:
1. based on the extracted grid lines, create the image W,
2. initialise the intensities for all the points,
3. enhance the intensity image with non-linear filtering.

The second and third steps are discussed next.

An initial value of the point intensities is obtained as follows. Points having a value W close enough to 1 are given an intensity equal to the observed intensity. These point are considered not to be covered by a line. To other points an intensity is assigned that takes into account the intensities in neighbouring pixels, and more so those of pixels with a high value for W. The weight used to let the different pixels contribute is the product of a Gaussian fall-off function centered at the pixel under consideration and the values W of these pixels. Hence, pixels contribute most if they are close to the considered pixel and are not covered by a grid line. This results in an intensity image where the dark lines have largely been removed. This initialisation image has a kind of disturbing noisy appearance, however.

In order to get rid of that noise and the grid residuals, a non-linear diffusion process is applied as a third step. It reduces noise but at the same time enhances step edges. As a point of departure, consider the following, slightly modified version of Nordström's equation [N. Nordström, Biased anisotropic diffusion, Proc. European Conf. Computer Vision, pp. 18–27, 1990]:

$$\frac{dI}{dt} = div(c(\nabla I)\nabla I) - \lambda W(I - I_o)$$

where I denotes the intensity of a point as it evolves under the non-linear diffusion and $I_o$ is its initial intensity in the camera image. W is the local weight as defined earlier and is absent in the original Nordström equation. The first term is a diffusion operator where the diffusion coefficient c depends upon the gradient $\nabla I$.

$$c(\overline{\nabla I}) = \frac{1}{1 + \left(\frac{\nabla I}{n}\right)^2} \quad (4)$$

As Perona and Malik [P. Perona and J. Malik, Scale-Space and Edge Detection Using Anisotropic Diffusion. *IEEE Transactions on Pattern Analysis and Machine Intelligence,* Vol.12, No.7, July 1990.] have pointed out, this term will reduce the noise and simultaneously generate sharp edges. The problem is that the corresponding staircasing yields undesired contouring effects. Therefore, the second term is introduced as a pull back force. It ensures that the resulting image I does not deviate too much form the original image $I_0$ except at the locations of the lines where W is small. This avoids artificial edges to be formed. The parameter I determines the relative influence of smoothing and the pull back force.

The above equation performs reasonably well, although this diffusion process still may cause false contouring and an artificial appearance due to oversmoothing of mildly textured regions. Therefore, we rely on a somewhat more sophisticated non-linear diffusion scheme that has been developed with image enhancement in mind [M. Proesmans, E. Pauwels, and L. Van Gool, Coupled geometry-driven diffusion equations for low-level vision, in *Geometry-driven Diffusion in Computer Vision,* ed. B. ter Haar Romeny, pp. 191–227, 1994]. This scheme is based on two coupled, non-linear diffusion processes. The first determines the evolution of intensity and comes very close to the Nordström equation, whereas the second equation specifies the simultaneous evolution of an estimate of local edge strength v.

$$\frac{dI}{dt} = vdiv(c(v)\nabla I) - \lambda W(I - I_o) \quad (5)$$

$$\frac{dv}{dt} = \rho \nabla^2 v - \frac{v}{\rho} + 2\mu(1 - v)\|\nabla I\| \quad (6)$$

In fact, v can be considered to be a sort of "fuzzy" but smooth edge-indicator which at each point indicates the "likelihood" of the existence of an edge [J. Shah, Segmentation by nonlinear diffusion, Proc. Conf. Computer Vision Pattern Recognition, pp. 202–207, 1991]. Hence, v is assumed to be close to 1 in the vicinity of an edge in I, and close to 0 everywhere else. The resulting set of equations continuously exchange information: the grey-level I steers v via its gradient, and conversely, v modulates and steers the diffusion of I. By making c dependent on v, edges can still be enhanced or kept, but false contouring will largely be avoided, since v is more or less a smooth version of the gradient of I: ρ acts as a diffusion coefficient on edge strength (and simultaneously weakens the refraining term −[v/(ρ)] to preserve edges at all). The parameters μ will determine the influence of edges on intensity diffusion. By v-modulating the diffusion operator v div( . . . ), oversmoothing will be avoided. Therefore, the resulting image will show a kind of fine texture, even in flat regions, giving it a realistic look.

FIG. 8a shows the original image of an eye, with the grid pattern projected on it. FIG. 8b shows the grid lines as they are extracted by the range detection procedures. Based on the grid lines the weight image W of FIG. 8c is generated. Using the coupled non-linear diffusion processes, the lines are then removed from FIG. 8a, guided by the weights given in FIG. 8c. The result is shown in FIG. 8d. The grid is hardly noticeable in this image, but scrutinizing the result it can still be discerned at places. It could be removed further, but the current parameter settings of the diffusion process were found to yield a good compromise between the suppression of the grid and the preservation of sufficient surface texture in order to avoid a synthetic, plastic-like appearance.

In summary, the procedure for intensity retrieval requires the setting of a number of parameters:
1. the parameter σ in the expression (1) for w(x),
2. the parameter n in the expression (1) for w(x),
3. the standard deviation—called σ'—of the Gaussian used to initialise the intensities,
4. the weighting factor λ of the pull-back force in the first diffusion equation (5),
5. the parameter κ in the definition (4) of the anisotropic diffusion function c,
6. the factor μ in the second diffusion equation (6),
7. the edge diffusion parameter ρ in the second diffusion equation (6).

All examples in this paper were obtained with exactly the same parameter settings: σ=σ'=ρ=1.25, κ=0.5, λ=5.0, and α=0.05.

An experiment was carried out where the possibility to have a dynamic target object and the ability to extract surface texture both bring a clear added value. It shows the extraction of a 3D reconstruction of a speaking face, obtained from a video sequence. Although the processing is not done on-line yet, the method nevertheless allows one to faithfully recover the whole motion in 3D by processing each of the frames of the video.

Figure 18:
FIG. 18 shows three image frames of a human face during speech of the phrase "say Hi"
Figure 18:
Figure 18:
Figure 19:
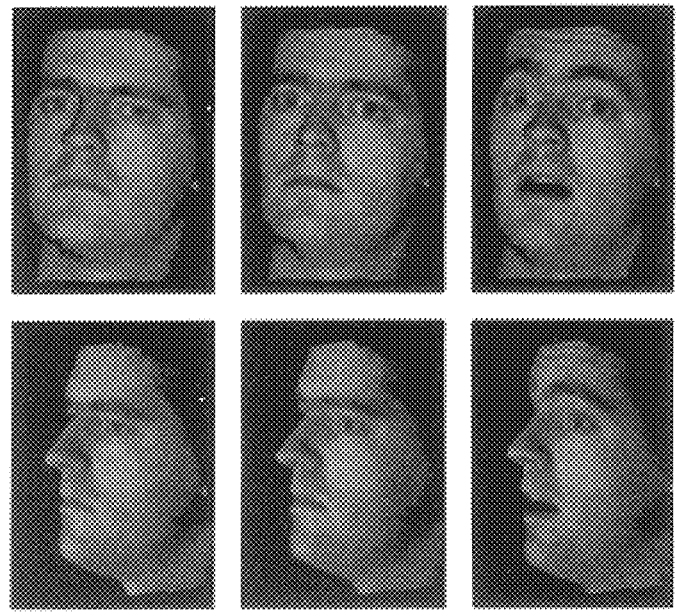
FIG. 19 shows texture-mapped 3-D reconstruction in accordance with the present invention for the captured images of FIG. 18, the upper three views are shown for the original camera position and a side view in the lower three views.
Figure 20:
FIG. 20 shows texture mapped 3D reconstruction in accordance with the present invention for the captured frames of FIG. 18 as seen in profile (top) and from overhead (bottom).

FIG. 18 shows three frames from the sequence. Note the grid pattern that is continuously projected. FIGS. 19 and 20 show the texture-mapped 3D reconstructions for the same three frames seen from four different viewpoints. As can be seen, the expressions of the face are faithfully reconstructed and the texture looks natural throughout. Also the shape data are satisfactory. Figure shows a close-up of two of the views. Note for instance the visibility of the ripples on the forehead in these side and profile views as undulations in the shape.

Typical computation times for each of the frames separately were 2 minutes for shape extraction and 2 minutes for intensity retrieval, on an SGI Indigo workstation. These times are a bit lower for simpler scenes such as the cup. In all the experiments the projector and camera were at about an equal distance from the object. For the face example this distance was about 4.5 m, for the cup and the coke can about 3 m. The baseline distance between the projector and the camera was about 0.7 m. Hence, the angle between the directions of projection and viewing was rather small. This renders precise shape extraction more difficult, but has the advantage that fewer projected grid points are occluded for the camera. The camera resolution was 576×768. The grid has 600 horizontal and 600 vertical lines. The portion visible to the camera is smaller, however. On the slide, the grid lines have a width of 10 µm and are repeated every 50 µm. The slide has been produced with lithographic techniques. Actually, a whole series of such grids with different resolutions and line widths have been produced for applications with different specs. Grids with fewer lines yield lower resolutions, but processing is faster.

FIG. 10 shows results obtained with this embodiment. FIGS. 10a and 10b show two input images for a hand and a face. FIGS. 10c and 10d show two views of the shape description obtained for the hand, FIGS. 10e and 10f the shape description of the face. FIGS. 10g and 10h show two views of the texture coated ("texture mapped") shape description of the face.

Using additional steps perspective effect in the projection and viewing geometry can be taken into account in the above described preferred embodiment of the method and device. Using data additions absolute dimensions and distances can be obtained, so that the unknown scale factor of the shape description disappears. It of course remains possible to add codes to the projection pattern which facilitate the identification of pattern components. Different projections and/or images can be used simultaneously. The surface texture can also be obtained from images in which the pattern is not visible—for instance by using non-visible wavelengths or switching off the pattern—and/or the texture can be extracted by filtering out the pattern in other ways than described in this embodiment.

The present invention is not defined by the above described preferred embodiment, in which many modifications are conceivable; the rights applied for are defined by the scope of the following claims within which variations can be envisaged.

What is claimed is:

1. A method of determining a three dimensional shape of a free-form object, comprising the steps of:
    (a) providing a pattern of components having a known relative positioning;
    (b) projecting said components of the pattern simultaneously onto the free-form object;
    (c) acquiring an image of the pattern projected onto the free-form object;
    (d) selecting one component out of the acquired image as a reference component;
    (e) determining relative positional coordinates of the pattern components other than the reference component in the acquired image with reference to the reference component; and
    (f) determining relative depths of positions on said three-dimensional shape of the free-form object by linear transformations of the relative positional coordinates based on one of a pseudo-orthographic and an orthographic geometrical model.

2. A method according to claim 1 including calculating relative, spatial positions of points on the three dimensional object directly from relative, observed positions of the components in the image.

3. A method according to claim 1 comprising projecting one single pattern and reconstructing the three dimensional shape of the free-form object on the basis of a single acquired image.

4. A method according to claim 1, wherein a sequence of three dimensional shapes is reconstructed from images acquired sequentially in time.

5. A method according to claim 1, wherein at least one pattern of lines is projected onto the object and the three dimensional shape is acquired on the basis of observed, relative distances between the lines and/or intersections of the lines of the pattern.

6. A method according to claim 5, wherein the pattern of lines is a grid of straight lines.

7. A method according to claim 6, wherein the grid consists of two mutually perpendicular series of parallel lines.

8. A method according to claim 1 including a step of minimizing inaccuracies in the extracted three dimensional shape that are due to perspective effects in the pattern projection or in the acquisition of the image(s).

9. A method according to claim 5, including extracting pattern lines and/or intersections thereof from the image or images.

10. The method according to claim 1 further comprising the steps of:
    determining a reliability of relative topological positioning of said components in said acquired image,
    modifying the relative positions in response to the reliability determining step to generate further relative positions, and
    determining relative depths of positions on said three-dimensional shape of the free-form object from the further relative position of said components in said acquired image.

11. A method according to claim 9, wherein the intersections of the lines are determined and the relative positions thereof in the pattern(s) are associated with relative sequential numbers.

12. A method according to claim 9, wherein positions of the lines are determined with a a precision better than of an imaging device used to acquire the image.

13. A method according to claim 12, wherein the positions of the lines are refined by treating them as a 'snake' or through a regularization technique.

14. A method according to claim 9, wherein intersections are determined with a higher precision than of an imaging device used to acquire the image.

15. A method according to claim 1, wherein the correctness of the extracted pattern(s) is checked and/or corrections are applied to the extracted pattern(s) through the comparison of the pattern that is actually projected with the shape the extracted pattern would yield if its three dimensional interpretation were viewed from a position from which the pattern is projected.

16. A method according to claim 1, including filtering out the pattern(s) to obtain texture.

17. A method according to claim 1, wherein a code is added to the projected pattern(s).

18. A method according to claim 17, wherein the code is used to correctly process and/or identify depth discontinuities.

19. A method according to claim 1, wherein calibration is achieved by presenting an object and extracting its shape in order to derive system parameters.

20. A method according to claim 19, wherein an object is presented that contains two planes that subtend a known angle and that are used for calibration.

21. A method according to claim 19, including taking at least two views of the same object to calibrate system parameters.

22. A method according to claim 21, wherein system parameters are calibrated by exploiting the fact that upon reconstruction from every image the shape of the part visible in more than one of the views should be identical.

23. A method according to claim 21 or 22, including projecting a pattern on a larger part of the object than that for which the three dimensional shape is reconstructed from a single image, while using a connectivity of the pattern to facilitate the registration and/or combination of multiple, partial reconstructions obtained from multiple images.

24. A method according to claim 19, wherein the shape of the object is known and the system parameters are obtained by a comparison of the reconstructed shape with the known shape.

25. A method according to claim 1, wherein the calibration of the system only requires the determination of the height-width proportion (i.e. the 'aspect ratio') of the pixels of a device use for acquiring the image and the relative direction of the pattern projection and image acquisition.

26. A system for obtaining a three-dimensional shape of an image of a free-form object, comprising:
at least one pattern generator for simultaneously projecting a pattern of components having a known relative positioning;
at least one imaging device for acquiring an image of the pattern projected onto the free-form object; and
means for selecting one component out of the acquired image as a reference component,
means for determining relative positional coordinates of the pattern components other than the reference component in the acquired image with reference to the reference component; and
computing means for determining relative depths of positions on said three-dimensional shape of the free-form object by linear transformations of the relative positional coordinates based on one of a pseudo-orthographic and an orthographic geometrical model.

27. A system according to claim 26, wherein only one pattern generator and one imaging device are used.

28. A system according to claim 26, wherein the pattern generator and the imaging device have a relative arrangement such that at least a part of the pattern is observed by the imaging device, and the projection and imaging direction(s) do not coincide.

29. A system according to claim 26, further comprising:
means for determining a reliability of relative topological positioning of said components in said acquired image,
means for modifying the relative positions in response to the reliability determining step to generate further relative positions, and
means for determining relative depths of positions on said three-dimensional shape of the free-form object from the further relative position of said components in said acquired image.

30. A system according to claim 26, wherein the pattern generator comprises means for detecting radiation that is invisible to the human eye.

31. A system according to claim 26, wherein the pattern generator comprises means for detecting a combination of different wavelengths.

32. A system according to claim 26, wherein the pattern generator comprises means for detecting the pattern during a short period of time and/or with interruptions.

33. A system according to claim 26, wherein the pattern generator, the imaging device, the computing means and the means for determining reliability are integrated into a single apparatus.

34. A method for acquiring a three-dimensional shape or image of an object or a scene including free-form surfaces, wherein one or more predetermined patterns made up of intersecting pattern components having a known relative positioning are projected simultaneously onto the object or scene, the method comprising the steps of:

projecting a pattern of intersecting components onto the object or scene along a projection path,
acquiring an image of the object or scene along an image acquisition path as viewed from a predetermined angle with respect to the projection path,
determining the relative positions of intersection points of pattern components in the acquired image with reference to a reference point in the acquired image, and
reconstructing the three dimensional shape of object or scene on the basis of computing relative three-dimensional positions of the intersection points, the relative three-dimensional positions of the intersection points being derived from one of a pseudo-orthographic and an orthographic geometrical model comprising the intersections of first and second parallel beams of rays, the first parallel beam of rays representing pattern projection rays and the second parallel beam of rays representing the image projection rays, an included angle between the first and second parallel beams of rays being a predetermined angle.

35. A method according to claim 34, wherein the step of determining the relative positions of intersection points includes constructing intersection points where the pattern components in the acquired image are interrupted.

36. A method according to claim 34, wherein the step of determining the relative positions includes the step of determining the reliability of the relative positions of the intersection points.

37. A method according to claim 34, wherein the pattern components are lines.

38. A method according to claim 37, wherein the pattern of lines is a grid of straight lines.

39. A method according to claim 38, wherein the grid consists of two mutually perpendicular series of parallel lines.

40. A method according to 37, wherein intersections of the lines are determined and the relative positions thereof in the pattern(s) are associated with a label.

41. A method according to claim 40, wherein the labels are re-determined after a reliability determination.

42. A method according to claim 34, wherein the intersection points are determined with a precision higher than that of the size of a pixel of an imaging device used to acquire the image.

43. A method according to claim 37, wherein positions of the lines are extracted from the acquired image and these positions are refined by a regularization technique.

44. A method according to claim 34, wherein one single pattern is projected and a three-dimensional shape of the object is reconstructed on the basis of a single acquired image.

45. A method according to claim 34, wherein a sequence of three-dimensional shapes is reconstructed from images acquired sequentially in time.

46. A method according to claim 34, wherein the reconstruction step is based upon observed deformations of the pattern components in the acquired image allowing for perspective effects.

47. The method according to claim 34, wherein a surface texture of the object or scene is extracted from the acquired image.

48. A method according to claim 47, wherein a texture is obtained by filtering out the pattern.

49. A method according to claim 47, wherein the surface texture is extracted during the period when no pattern is projected.

50. A method according to claim 34, wherein a code is added to the projected pattern.

51. A method according to claim 34, further comprising a calibration step of presenting an object or a scene that contains two planes which subtend a known angle.

52. A method according to claim 51, wherein the calibration step includes determination of a height-width ratio of the pixels of a device for acquiring the image and the angle between the pattern projection path and image acquisition path.

53. A system for obtaining a three-dimensional shape of a scene or object including free-form surfaces, comprising:
- at least one pattern generator for projecting a pattern of intersecting components having a known relative positioning onto the scene or object;
- at least one camera for observing the scene or object and for acquiring one or more images; comprising:
  - computing means for determining the relative positions of intersection points of pattern components in the acquired image with reference to a reference point in the acquired image, and for reconstructing the three-dimensional shape of the three-dimensional shape of object or scene on the basis of computing relative three-dimensional positions of the intersection points, the relative three-dimensional positions of the intersection points being derived from a pseudo-orthographic or orthographic geometrical model comprising the intersections of first and second parallel beams of rays, the first parallel beam of rays representing pattern projection rays and the second parallel beam of rays representing the image projection rays, an included angle between the first and second parallel beams of rays being a predetermined angle.

54. A system according to claim 53, wherein the system is adapted for determining the reliability of the relative positioning of the components in the acquired image.

55. A system according to claim 53 wherein only one pattern generator and one camera are used.

56. A system according to claim 53, wherein the pattern generator is adapted to project radiation that is invisible to the human eye.

57. A system according to claim 53, wherein the system is adapted to extract a surface texture of the object or scene from the acquired image.

* * * * *